No. 636,468. Patented Nov. 7, 1899.
R. D. STRANG.
ENVELOP OPENER.
(Application filed Mar. 7, 1899.)
(No Model.)
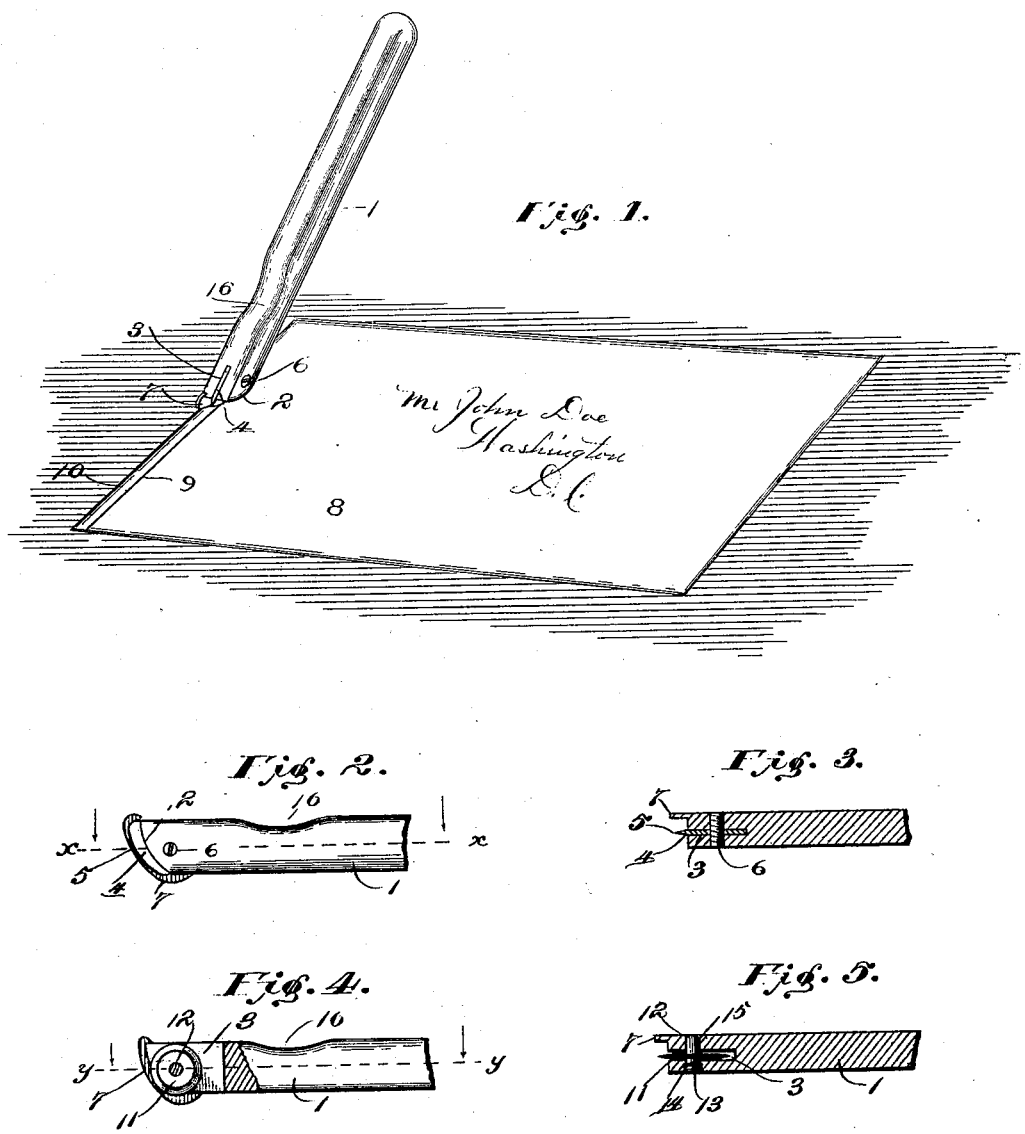

UNITED STATES PATENT OFFICE.

RELLY D. STRANG, OF BRONSON, MICHIGAN.

ENVELOP-OPENER.

SPECIFICATION forming part of Letters Patent No. 636,468, dated November 7, 1899.

Application filed March 7, 1899. Serial No. 708,131. (No model.)

*To all whom it may concern:*

Be it known that I, RELLY D. STRANG, a citizen of the United States, residing at Bronson, in the county of Branch and State of Michigan, have invented a new and useful Envelop-Opener, of which the following is a specification.

This invention relates to envelop-openers, and has for its object to provide an implement of this character which will effectively open a sealed envelop without destroying or damaging the contents thereof.

To this end the present invention consists in the combination and arrangement of parts, as will be hereinafter more fully described, shown in the accompanying drawings, and particularly pointed out in the appended claim.

In the drawings, Figure 1 is a perspective view of the device as applied to open an envelop. Fig. 2 is a side elevation of the cutting end of the implement. Fig. 3 is a sectional view taken on the line $x\,x$, Fig. 2. Fig. 4 is a longitudinal sectional view showing a modified form of cutter. Fig. 5 is a sectional view on the line $y\,y$, Fig. 4.

Like numerals of reference denote like and corresponding parts in each of the several figures of the drawings.

Referring to the accompanying drawings, 1 designates the handle of the implement, having its head rounded or beveled rearwardly and downwardly, as at 2. The head of the handle is bifurcated vertically and longitudinally, as at 3. Situated within this bifurcation is a cutter-blade 4, having a rounded or beveled cutting edge 5, corresponding to the rounded portion of the head, projecting longitudinally beyond the same and extending the entire width thereof. A suitable screw 6 passes through the sides of the bifurcation 3 and the cutter-blade, whereby the latter is removably held to the head, and a new blade may be substituted for a worn or broken one. A guard 7 extends outward beyond the cutting edge of the blade and flush with one face of the handle. This guard may be formed integral with the handle, as shown, or it may be a separate plate secured to the face of the handle, as desired.

The operation of the implement is illustrated in Fig. 1, in which 8 designates a sealed envelop, and the implement is shown as having partly cut the end of the envelop. The guard 7 is placed against the end of the envelop, which disposes the cutting edge of the knife-blade slightly inward from the edge of the envelop, and by drawing the implement across the face of the same the guard 7, in contact with the edge of the envelop, will guide the implement, and the knife-blade will cut the envelop, as indicated by the line 9. The edge of the guard is smooth and rounded or beveled and extends beyond the cutting edge of the blade, as described, so that the guard may rest upon the desk or other surface upon which the envelop may be placed, and the knife-blade will cut through the upper thickness only of the envelop, thus avoiding damaging the contents of the envelop. When the envelop has thus been cut, the narrow flap 10 produced thereby may be readily raised and the letter and contents of the envelop may be removed.

The curvature of the edge of the guard is a trifle greater than that of the edge of the blade, so that its projection beyond the blade increases slightly toward each end of the blade, as shown in Figs. 3 and 4. By forming the guard in this manner it is evident that by changing the inclination of the handle relatively to the surface of the envelop one way or the other the distance to which the edge of the blade may approach the table or other support on which the envelop is placed may be varied, thereby causing it to cut only the one thickness of the envelop, whatever may be the thickness of the paper from which the envelop is made. By forming the edge of the guard and of the blade at an angle to the length of the handle they can be made longer than if they extended only across it at right angles, and it also permits of the handle being held at an angle to the surface of the envelop, whereby a much firmer grasp can be had upon the handle than if it were operated in a vertical position.

Another advantage arising from the peculiar formation of the edges of the guard and of the blade relatively to each other is that each end of the guard may be extended beyond the blade to such an extent that it can be placed upon the table beyond the edge of the envelop and moved laterally until it strikes the edge of the envelop without the edge of the blade coming in contact with the envelop. As soon as the guard is against the edge of the envelop the inclination of the handle is varied sufficiently to cause the edge of the blade to come into contact with and cut through the desired thickness of the envelop as the instrument is drawn across it. If the blade did not cut the paper freely, it could be made to do so more readily by rocking the handle back and forth to change its inclination, which would roll the edge of the cutter upon the paper and at the same time move it toward and from the support on which the envelop is placed, thereby causing it to be gradually forced through the body of the envelop.

By cutting the bottom of the slot in the handle in a straight line and causing the back of the blade to fit against it a very strong and durable construction is secured, and the blade is rigidly held in position with but one screw.

A modified form of cutting-blade is shown in Figs. 4 and 5, which embodies a rotary disk cutter 11. In this form the handle and guard are the same as described for the fixed cutter, the disk being mounted within the bifurcation 3 upon a pivot-pin 12. This pin has an enlarged threaded head 13, which fits into a threaded opening 14 in one face of the head of the handle, and the smooth reduced portion 12 of the pin passes transversely through the bifurcation 3 and has its inner end received in a suitable recess 15, formed in the opposite side of the bifurcation. The disk is thus mounted to rotate within the bifurcation, and the pivot-pin may be removed in order that a new cutter may be substituted for a worn or broken one.

In each form the upper side of the handle contiguous to the cutter end is provided with a depression 16 for the reception of the index-finger when operating the implement. It will be understood that the handle is grasped by the fingers of the hand, the rear end of the handle resting against the palm of the hand and the index-finger resting in the depression, whereby the pressure is placed directly upon the knife-blade, and the implement may be effectively manipulated. The rounded or beveled cutting edge of either form of cutter gives a drawing action and the envelop is cut clean and even, avoiding a tearing or ripping action, which would produce ragged edges and is liable to tear the envelop and its contents. The present implement cuts from the exterior and through one thickness only of the envelop, and therefore cannot injure the contents thereof.

The present invention provides an exceedingly useful envelop-opener, which is light and durable and easily and effectively operated. The cutting-blade is the only part that is likely to become worn or broken, and this part may be readily replaced.

Changes in the form, proportion, size, and the minor details of construction within the scope of the appended claim may be resorted to without departing from the spirit or sacrificing any of the advantages of this invention.

Having thus described the invention, what I claim is—

In an envelop-opener, the combination, with a handle, one end of which is slotted longitudinally and provided with a curved segmental flange flush with one side thereof and parallel with said slot and projecting at its ends beyond the sides of the handle, of a curved plate secured within the slot, the edge of which lies wholly within and parallel with the edge of the flange and has the radius of its curvature substantially parallel with the radius of the curvature of the flange and at an angle to the length of the handle, one side of the handle being provided with a depression substantially in a line with the radius of the curves of the blade and flange.

In testimony that I claim the foregoing as my own I have hereto affixed my signature in the presence of two witnesses.

RELLY D. STRANG.

Witnesses:
CHAUNCEY M. VAN EVERY, Jr.,
ROBERT N. SANDERSON, Sr.